(12) United States Patent
Karabeyoglu et al.

(10) Patent No.: US 6,880,326 B2
(45) Date of Patent: Apr. 19, 2005

(54) HIGH REGRESSION RATE HYBRID ROCKET PROPELLANTS AND METHOD OF SELECTING

(75) Inventors: M. Arif Karabeyoglu, Palo Alto, CA (US); David Altman, Menlo Park, CA (US); Brian J. Cantwell, Palo Alto, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 09/505,516

(22) Filed: Feb. 17, 2000

(65) Prior Publication Data

US 2002/0036038 A1 Mar. 28, 2002

Related U.S. Application Data

(62) Division of application No. 09/359,149, filed on Jul. 21, 1999, now Pat. No. 6,684,624.
(60) Provisional application No. 60/093,696, filed on Jul. 22, 1998.

(51) Int. Cl.$^7$ ............................. F02K 9/28; C06B 45/06; D03D 23/00
(52) U.S. Cl. ........................... 60/251; 149/18; 149/109.4
(58) Field of Search ........................... 149/109.6, 1, 18, 149/109.4; 60/220, 251, 257

(56) References Cited

U.S. PATENT DOCUMENTS

| | | | | |
|---|---|---|---|---|
| 3,289,412 A | * | 12/1966 | Iwanciow | 60/251 |
| 3,677,011 A | * | 7/1972 | Vicland | 60/251 |
| 3,727,407 A | | 4/1973 | Rains et al. | 60/220 |
| 3,730,093 A | | 5/1973 | Cummings | 102/6 |
| 3,744,427 A | | 7/1973 | Good et al. | 102/100 |
| 4,420,931 A | | 12/1983 | Anderson | 60/219 |
| 4,812,179 A | | 3/1989 | Sayles | 149/19.2 |
| 5,529,648 A | | 6/1996 | Stickler | 149/19.1 |
| 5,616,882 A | * | 4/1997 | Nichols et al. | 102/287 |
| 5,715,675 A | | 2/1998 | Smith et al. | |

OTHER PUBLICATIONS

Hawley (ed.) The Condensed Chemical Dictionary, 9$^{th}$ Ed., 1977, Van Nostrand Reinhold Company, New York, pp. 650, 698, 924–925.*

DeRose, M.E., et al., "Tube Burner Studies of Cryogenic Solid Combution", 33rd AIAA/ASME/SAE/ASEE Joint Propulsion Conference & Exhibit, AIAA Paper No. 97–3076, Jul. 1997, pp. 1–12.

Gater, R.A., et al., "A Fundamental Investigation of the Phenomena that Characterize Liquid Film Cooling", J. Heat Mass Transfer, vol. 13, 1970, pp. 1925–1939.

Ishii, M., et al., "Inception Criteria for Droplet Entrainment in Two–Phase Concurrent Film Flow", AIChE Journal, vol. 21, No. 2, Mar. 1975, pp. 308–318.

Marxman, G. A., et al., "Fundamentals of Hybrid Boundary–Layer Combustion", Progress in Astronautics and Aeronautics, vol. 15, 1964, pp. 485–522.

Nigmatulin, R. I., et al., "Entrainment and Deposition Rates in a Dispersed–Film Flow", Int., J. Multiphase Flow, vol. 22, No. 1, 1996, pp. 19–30.

* cited by examiner

Primary Examiner—Aileen Felton
(74) Attorney, Agent, or Firm—Dorsey & Whitney LLP

(57) ABSTRACT

This invention comprises a new process for developing high regression rate propellants for application to hybrid rockets and solid fuel ramjets. The process involves the use of a criterion to identify propellants which form an unstable liquid layer on the melting surface of the propellant. Entrainment of droplets from the unstable liquid-gas interface can substantially increase propellant mass transfer leading to much higher surface regression rates over those that can be achieved with conventional hybrid propellants. The main reason is that entrainment is not limited by heat transfer to the propellant from the combustion zone. The process has been used to identify a new class of non-cryogenic hybrid fuels whose regression rate characteristics can be tailored for a given mission. The fuel can be used as the basis for a simpler hybrid rocket design with reduced cost, reduced complexity and increased performance.

5 Claims, 8 Drawing Sheets

HIGH REGRESSION RATE HYBRID ROCKET PROPELLANTS AND METHOD OF SELECTING

CROSS-REFERENCE TO RELATED APPLICATIONS

This is a division of application Ser. No. 09/359,149 filed Jul. 21, 1999.

This application claims the benefit of U.S. Provisional Patent Application No. 60/093,696, filed Jul. 22, 1998, the entire disclosure of which is incorporated herein by reference.

GOVERNMENT LICENSE RIGHTS

This invention was made in part with Government support under contracts NCC2-55-29 and NC2-55-30 awarded by the National Aeronautics and Space Administration. The Government has certain rights in this invention.

FIELD OF THE INVENTION

The present invention relates generally to the field of propellants suitable for use in hybrid rockets, and more particularly to propellants and a method of selecting propellants that exhibit high regression rates.

BACKGROUND OF THE INVENTION

Two basic types of chemical rocket propulsion systems are widely used in the rocket industry; namely, liquid systems and solid propellant systems. In a liquid system, liquid oxidizer and liquid fuel are fed at high pressure to a combustion chamber where they mix and react producing high temperature, high pressure gases which exhaust through a converging-diverging nozzle producing thrust. The mixing of reactants requires a high performance pressurization system for the fuel and oxidizer which must often operate in a cryogenic environment at extreme pressures and mass flow rates. The injection system and combustion chamber require exotic materials, complex systems for cooling, and very high precision manufacturing techniques. All of these factors contribute to a high cost.

Solid propellant systems do not require the complex and expensive machinery of liquid systems. Nevertheless, solid systems are complicated, and are subject to the difficulties of producing crack-free, repeatable, fuel grains, and by the need to transport and handle explosive materials. In a manufacturing process that requires extreme safety precautions, solid fuel and oxidizer are intimately mixed and allowed to cure inside the rocket case producing an explosive fuel with roughly the consistency of plastic or hard rubber. Fuel grains which contain cracks present a risk of explosive failure of the vehicle and must be rejected, driving up the cost of manufacture. Upon ignition the solid fuel burns uninterrupted until all the fuel is exhausted.

An alternative chemical rocket which has been known since the 1930's is the hybrid propulsion system. In the hybrid design one propellant is stored in the solid phase while the other is stored in the liquid phase. Thus the hybrid lies somewhere between the two basic chemical rocket designs just described. In most hybrid propulsion applications, the solid is the fuel and the liquid is the oxidizer. Reverse hybrids with the fuel in the liquid phase and oxidizer in the solid phase are also feasible and the present invention described below can be applied equally well to both types of hybrid systems.

A large variety of fuels, including trash and wood, have been considered for hybrid rockets but the most conventional fuel materials are polymers such as Plexiglas (polymethyl methacrylate) (PMMA), high density polyethylene (HDPE), hydroxyl terminated polybutadiene (HTPB), and the like. Typical oxidizers that are frequently used in hybrid rockets are liquid oxygen, hydrogen peroxide, nitrogen tetroxide, nitrous oxide and occasionally fluorine. With respect to the last point, the fuel combinations used for hybrids are similar in their chemical properties and energy densities to the fuels used in hydrocarbon fueled liquid rocket systems. Thus, in terms of exhaust velocity and specific impulse, the hybrid system is a closer relative to a liquid system than to a solid system. Solid rockets tend to use lower energy oxidizers and consequently they produce lower specific impulse.

In addition to having a higher specific impulse, some of the advantages of the hybrid rocket over the solid fuel rocket are:

The hybrid allows for thrust termination, restart and throttling capabilities,

The hybrid design lends itself to safe manufacturing, transportation and operation.

Hybrid motors are inherently immune to explosion,

The safety and simplicity of the hybrid leads to lower development costs for new systems and very likely lower operational costs, The combustion products are generally very benign producing lower environmental impact.

The main advantages of the hybrid over the liquid rocket include:

Lower development and operating costs (life cycle costs),

Lower fire and explosion hazards,

Less complex design and potentially higher reliability.

The hybrid allows the addition of energetic solid components, such as aluminum or beryllium to the fuel.

A schematic of a typical hybrid propulsion system 10 with a pressurized oxidizer feed system is shown in FIG. 1. The feed system is comprised of a pressurization tank 12 that holds an inert gas at high pressure (such as Helium, Argon or Nitrogen), a valve (not shown) to pressurize the oxidizer tank 14, a main valve 16 to turn on the flow of oxidizer and an injection system 18. Alternatively, the gas pressurization system can be replaced with a turbopump. The other major components are the combustion chamber 20 which contains the solid fuel 22 and the nozzle assembly 24.

A sketch of the flame configuration in a single port hybrid rocket combustion chamber 30 is shown in FIG. 2. The single port combustion chamber 30 generally includes a pre-combustion chamber region 31 at the front end, a post-combustion chamber region 32 at the opposite end, and an elongated single port 33 extending between the ends. The oxidizer in the liquid phase is injected into the combustion chamber at pre-combustion chamber region 31. The injected oxidizer is gasified and flows axially along the port 33, forming a boundary layer 34 over the solid fuel 22. The boundary layer 34 is usually turbulent in nature over a large portion of the length of the port. Within the boundary layer 34 there exists a turbulent diffusion flame 36 which extends over the entire length of the fuel. The thickness of the flame is generally very small compared to the boundary layer thickness. The heat generated in the flame, which is located approximately 20–30% of the boundary layer thickness above the fuel surface, is transferred to the wall mainly by convection. Some heat is also transferred by radiation but this is usually relatively small compared to the convective heat transfer. In the conventional hybrid system depicted in FIG. 2, the wall heat flux evaporates the (generally polymeric) solid fuel and the fuel vapor is transported to the flame where it reacts with the oxidizer which is transported from the free stream by turbulent diffusion mechanisms. The unburned fuel that travels beneath the flame, the unburned oxidizer in the free stream, and the flame combustion products mix and further react in the post combustion chamber 32. The degree to which fuel and oxidizer are able to fully mix and react before exhausting through the nozzle 24 determines the combustion efficiency of the motor. The hot gases expand through a convergent-divergent nozzle 24 to deliver the required thrust.

It is important to note that, even though the geometry of a hybrid motor is similar to a solid motor, the combustion scheme is vastly different. In a solid rocket, the oxidizer and fuel are both stored in the solid phase next to each other for heterogeneous fuels and within the same fuel molecule for double base fuels. Consequently, the solid combustion takes place in a deflagration (premixed) flame that is closer to the surface compared to the hybrid diffusion flame. Also, in solid fuel systems there exists some heterogeneous phase (solid-solid, solid-gas) reactions at the surface. In short, the burning rate of a solid rocket is determined by the rate of homogeneous (gas phase) and heterogeneous chemical reactions.

In a hybrid system or motor, the burning rate is limited by the heat transfer from the relatively remote flame to the burning surface of the fuel. One of the physical phenomena that limits the burning rate in a hybrid motor is the so-called blocking effect that is caused by the high velocity injection of the vaporizing fuel into the gas stream. This difference in the combustion scheme of a hybrid motor significantly alters the burning rate characteristics compared to a solid rocket. Blocking can be explained as follows. Increasing the heat transfer to the fuel causes the evaporative mass transfer from the liquid-gas interface to increase. But the increased blowing from the surface reduces the temperature and velocity gradient at the surface thus reducing the convective heat transfer. The blowing also thickens the boundary layer and displaces the flame sheet further from the fuel surface leading to a further reduction in convective heat transfer. The position of the flame sheet and the shape of the thermal and velocity boundary layer is the result of a complex chemical and fluid mechanical balance between the oxidizer flow entering the port, the fuel flow produced by evaporation and the flow of combustion products. As a result, the burning rate is limited in a fundamental way which is difficult to overcome by either increasing heat transfer to the fuel or by a reduction in the fuel heat of gasification. Although radiative heat transfer from the flame does not suffer from the blocking effect it is usually small compared to the convective heat transfer. The upshot of all this is that the regression rate, defined as the recession speed of the solid surface of a conventional hybrid fuel is typically one-tenth or less than that of a solid rocket fuel.

For a given selection of fuels and oxidizer to fuel mass ratio, the thrust generated by a rocket is approximately proportional to the mass flow rate. Thus a given thrust requirement dictates the fuel mass flow rate that needs to be achieved. The fuel mass flow generation rate is a product of the fuel density times the regression rate, multiplied by the burning surface area. The fuel density is determined by the type of fuels. Generally, high thrust levels are required for a launch vehicle. For a hybrid rocket design based on a slow burning conventional fuel, high thrust can only be achieved by increasing the burning surface area. The high burning area requirements, and various other design constraints (such as the maximum grain length to port diameter ratio), leads to complicated multi-port configurations. One commonly used multi-port configuration is the wagon wheel geometry as shown in FIG. 3, and has been implemented in several hybrid motor designs.

The wagon wheel configuration and all other complicated multi-port designs have serious disadvantages. These disadvantages include:

the large sliver fractions, which may in practice leave significant amounts of fuel unburned;

fairly small volumetric loading of the fuel in the casing leading to decreased mass fractions;

grain integrity problems, especially towards the end of the burn when the web thickness between ports becomes vulnerable to structural disintegration;

difficult and expensive manufacturing of the fuel grain; and requirement for a pre-combustion chamber or multiple injectors.

It is clear that all these factors seriously degrade the overall efficiency and cost of a multi-port hybrid launch vehicle.

The low regression rates and consequent multi-port design requirements make hybrids an unattractive option, even though they offer significant advantages over currently used liquid and solid systems. In order for the hybrid to find use as a practical design with a variety of applications, higher regression rates are required. Thus, so far many techniques have been suggested, or tried, to improve the regression rates of hybrids, however all of these techniques suffer important shortcomings. More specifically, one such prior art method uses fuels with low effective heat of gasification. This method yields only a small improvement since, as revealed in the classical hybrid theory (reference 1), the exponent of the heat of gasification is a small number (approximately 0.32). The weak dependency of the regression rate on the heat of gasification is due to the blocking effect described earlier. Other prior art techniques use insertion of screens in the port to increase the turbulence level, and thus the heat transfer rates. As with any method which requires that devices be placed in the gas flow path, this method complicates the design significantly and increases the likelihood of failure. In addition, this approach may lead to nonuniform burning along the port.

The addition of swirl to the incoming oxidizer flow to increase the effective mass flux and thus improve the heat transfer rate has also been reported (Reference 8). This method also complicates the hybrid design, especially for large scale motors, and requires heavy injectors or vanes.

Another prior art approach employs the addition of oxidizing agents or self decomposing materials in the hybrid fuel. This well known technique reverts to a quasi-solid design and eliminates the inherent safety characteristic of hybrid rockets.

The addition of metal additives has also been used. This is a common technique that improves the fuel mass burning rate. The improvement is small, however, and there are several shortcomings such as the increased vulnerability to instabilities due to the pressure dependent regression rate and increased environmental impact.

Yet another prior art technique focuses on increasing the roughness of the burning surface by adding dispersed phase particles in the fuel that would burn at a different rate compared to the matrix material (Reference 9). This technique can only give a limited improvement and large solid particles injected in the gas stream reduce the efficiency of the system. The manufacturing costs would also increase.

As just described, the prior art techniques are subject to significant limitations and disadvantages. Accordingly, it is highly desirable to provide a propellant and hybrid system which exhibits a high regression rate, without compromising safety or manufacturing cost.

RELEVANT LITERATURE

[1] Marxman G. A., C. E. Wooldridge and R. J. Muzzy, "Fundamentals of Hybrid Boundary Layer Combustion", Progress in Astronautics and Aeronautics, Vol. 15, 1964 p 485.
[2] Karabeyoglu M. A., "Transient Combustion in Hybrid Rockets", Stanford University Ph.D. Thesis, August 1998.
[3] Gater R. A. and M. R. L'Ecuyer, "A Fundamental Investigation of the Phenomena that Characterize Liquid Film Cooling", International Journal of Heat and Mass Transfer Vol. 13, pp 1925–1939, 1970.
[4] Ishii M. and M. A. Grolmes, "Inception Criteria for Droplet Entrainment in Two Phase Concurrent Film Flow", AICh Journal, vol. 21, no. 2, pp. 308–318, 1975.
[5] Nigmatulin R., B. Nigmatulin, Y A. Khodzaev and V. Kroshilin, "Entrainment and Deposition Rates in a Dispersed-Film Flow", International Journal of Multiphase Flow Vol. 22, pp. 19–30, 1996.
[6] Bicerano, J, "Prediction of Polymer Properties", Marcel Dekker Inc., 1996.
[7] Dauber, T. E., Danner, R. T., "Physical and Thermodynamic Properties of Pure Chemicals, Data Compilation", Taylor and Francis, 1997.
[8] W. H. Knuth, M. J. Chiaverini, D. J. Gramer and J. A. Saver, "Solid-Fuel Regression Rate and Combustion Behavior of Vortex Hybrid Rocket Engines", Thirty-fifth Joint Propulsion Conference and Exhibit, AIAA Paper No. 99–2318, 1999.
[9] D. B. Stickler, "Heterogeneous Fuel for Hybrid Rocket", U.S. Pat. No. 5,529,648 issued Jun. 25, 1996.
[10] DeRose, M. E., K. L. Pfeil, P. G. Carric and C. W. Larson, "Tube Burner Studies of Cryogenic Solid Combustion", AIAA/SAE/ASME/ASEE Thirty-third Joint Propulsion Conference and Exhibit, AIAA Paper No. 97–3076, July 1997.

OBJECTS AND SUMMARY OF THE INVENTION

Accordingly, it is an object of the present invention to provide hybrid rocket propellants that exhibit a high regression rate, or more specifically, that will burn several times faster than conventional propellants at the same operating conditions of port mean mass flux and chamber pressure while retaining the basic advantages of hybrids; throttlability, safety and low cost. In addition to a high burning rate it is desired, but not required, that the propellant have the following characteristics:

self-decomposing materials are not involved;
the port design can be structurally simple;
the propellant is safe, easy to handle and easy to process;
the propellant burns smoothly; and
the burning rate is reasonably uniform along the axial and in the azimuthal directions in the port.

It is also an object of the present invention to provide a method of selecting, or identifying, such hybrid rocket propellants.

As described in the Background, in a hybrid rocket combustion chamber, liquid oxidizer is converted to gas and caused to flow over the solid fuel surface. In a reverse hybrid the oxidizer is the solid. Upon ignition, a flame sheet is formed above the solid surface and heat from the flame melts the solid causing a liquid layer to form. Evaporation from the liquid-gas interface produces a continuous flow of fuel gas which mixes with oxidizer at the flame sheet thus maintaining the combustion. At steady state, the regression rate of the melt surface and the liquid-gas interface are the same and the thickness of the liquid layer is constant. FIG. 4 shows typical steady state temperature and velocity profiles in a liquefying hybrid rocket.

The inventors have discovered, and according to the present invention, the liquid layer at the melt surface can be hydrodynamically unstable under the mass flux, pressure and temperature conditions which occur in a hybrid rocket combustion chamber. This shear-driven instability leads to wave formation on the liquid-gas interface and as the waves develop nonlinearly, the displaced liquid-gas interface exposed to the high speed flow of gas can breakup, leading to the formation of concentrated pockets of high density fuel and/or fuel droplets which are entrained into the gas stream. The mechanism of liquid layer instability and entrainment can substantially increase the rate of mass transfer from the fuel surface. This situation is illustrated schematically in FIG. 5.

We have developed a method for solid propellant selection or identification that takes the mechanism of liquid layer instability and entrainment into account. This method of the present invention has been used to identify high regression rate solid fuels and to predict their performance. It can be applied equally well to solid fuels or oxidizers which are collectively referred to as propellants. An important element of the process is a criterion that determines whether a given solid propellant is more or less likely to produce entrainment for a given set of combustion chamber conditions.

Accordingly, the present invention provides for a fuel composition suitable for use in hybrid rockets having a fuel component and an oxidizing component. One of the components flows past the other, and under the heat of combustion (heat transfer from the flame) one of the components forms an unstable melt layer with viscosity and surface tension such that droplets from the melt layer are entrained in the other component thereby increasing the burning rate. The present invention can also be used in formulating a fast burning fuel for solid fuel ramjet applications.

In another aspect of the present invention a propulsion system is provided. The propulsion system includes a vehicle structure, terminating in a nozzle and having a fuel component within the structure. One or more combustion chambers are formed within, or alternatively contain, the fuel component. Also provided is an oxidant vessel within the vehicle structure for flowing the oxidant in contact with the one or more combustion chambers to react with the fuel. The fuel is selected such that under the heat transfer from the flame, the fuel forms an unstable melt layer with viscosity and surface tension such that droplets of the melted fuel are entrained in the flowing oxidant thereby increasing the burning rate.

In yet another aspect of the present invention, a combustible hybrid fuel having a solid fuel component and a flowing oxidizer component flowing through one or more ports is provided. The solid fuel forms a liquid layer at the interface between the oxidizer and fuel, and the liquid layer exhibits entrainment of liquid droplets in the flowing oxidizer at an entrainment rate of $$\dot{r}_{ent} \propto \frac{(C_f P_d)^\alpha h^\beta}{\mu^\gamma \sigma^\pi}.$$

In still another aspect of the present invention a method of selecting a propellant that exhibits a desirable regression rate during combustion within a port having a gas stream flowing through the port is provided. The method comprises the steps of:

for a given port mass flux, $G=\rho_g U_g$, where $\rho_g$ is the port average gas density and where $U_g$ is the port average gas velocity; and for a thickness h of a liquid layer formed on the surface of the fuel;

wherein the port mass flux value and the thickness satisfy the relationship of $$G^{1.6} h^{0.6} \geq a_{onset}$$

and where $a_{onset}$ is the entrainment onset parameter and is given by:

$$a_{onset} = 1.05 \times 10^{-2} \left(\frac{\rho_g^{1.3}}{\rho_l^{0.3}}\right) \frac{1}{(C_{fref} C_{BI})^{0.8}} \left(\frac{1}{\mu_g}\right) \sigma \mu_l^{0.6} \text{ and}$$

selecting the propellant such that $a_{onset}$ has a value that promotes entrainment of droplets from the liquid layer into the gas stream in the port.

BRIEF DESCRIPTION OF THE DRAWINGS

Additional objects and advantages of the invention will become apparent in reading the detailed description of the invention and the claims and with reference to the figures, in which:

DETAILED DESCRIPTION OF THE INVENTION

Figure 1:
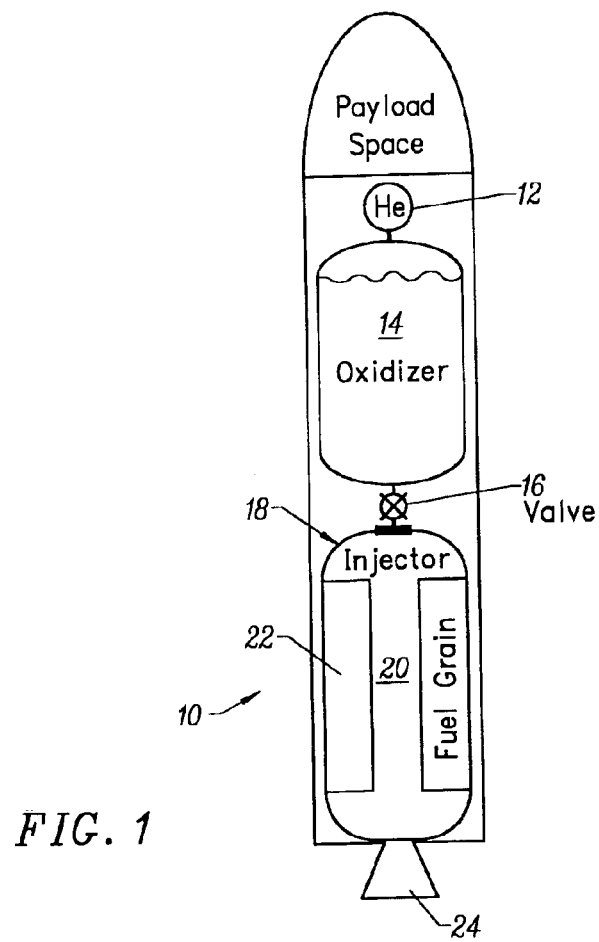
FIG. 1 is a schematic diagram of a hybrid rocket which may be employed with the present invention.
Figure 2:
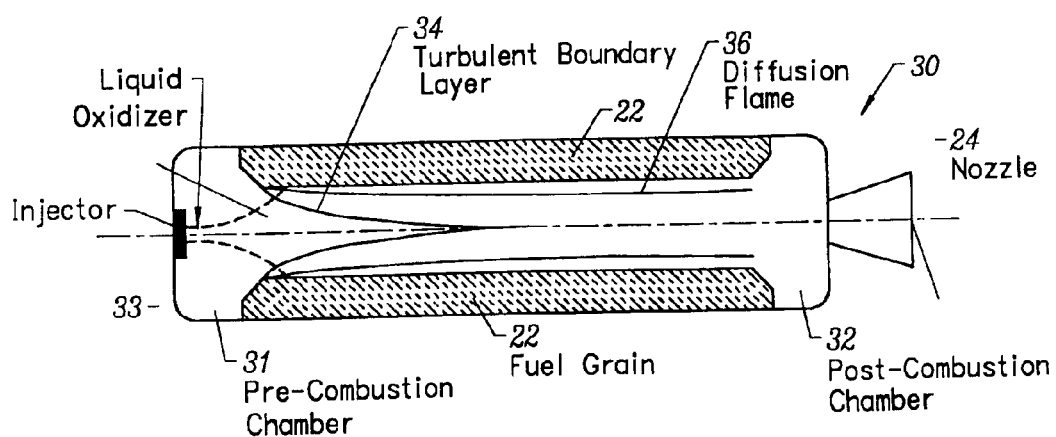
FIG. 2 is a schematic diagram of the combustion configuration in a single port hybrid rocket motor.
Figure 3:
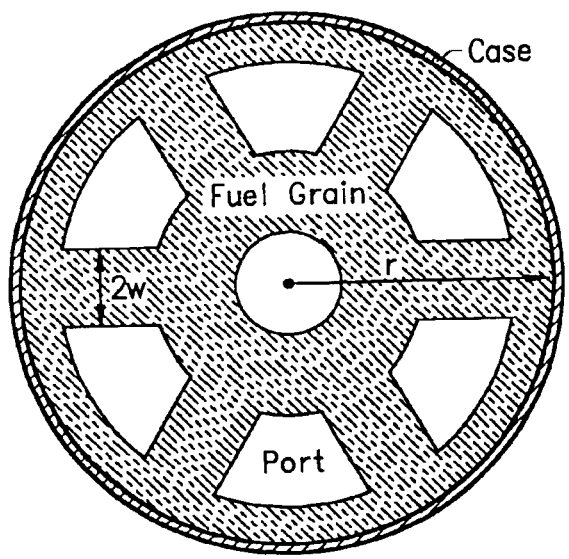
FIG. 3 is a schematic diagram of a wagon wheel port hybrid rocket motor.
Figure 4:
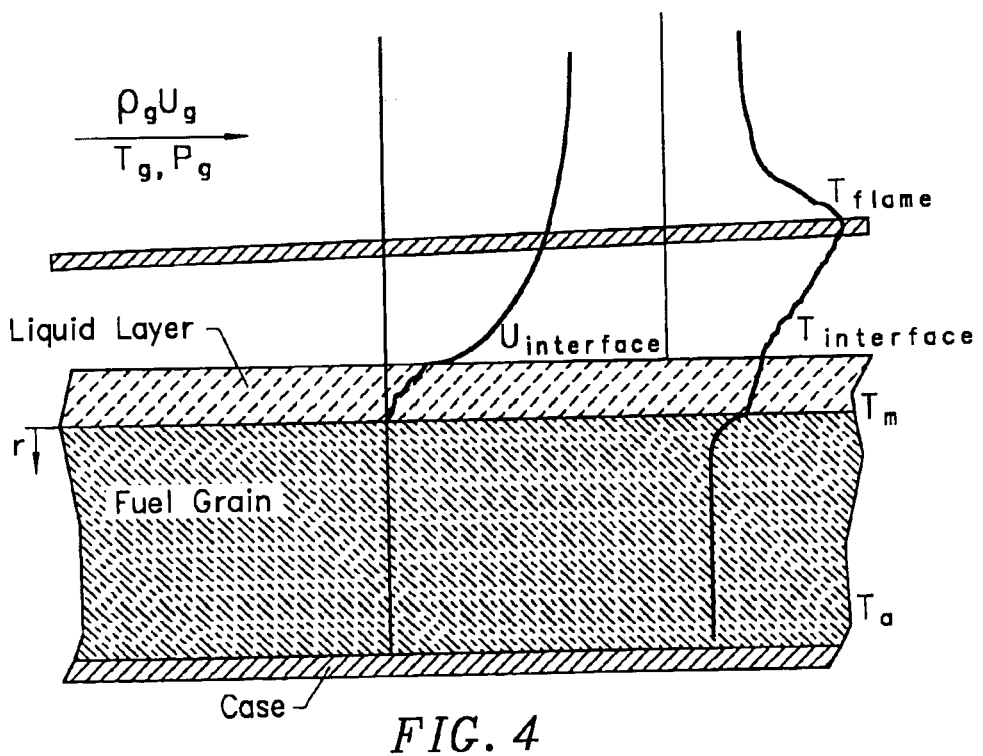
FIG. 4 is a schematic diagram illustrating velocity and temperature profiles in a liquefying hybrid rocket.

The invention is now described in more detail. The following terms used throughout the description herein are defined below as:

| | |
|---|---|
| $a_h$ | Liquid layer thickness parameter, $m^2/sec$ |
| $a_{cl}$ | Classical regression rate parameter, $m^{2.6}/kg^{0.8} - sec^{0.2}$ |
| $a_{onset}$ | Entrainment onset parameter, $kg^{1.45}/m^{2.3} - sec^{1.45}$ |
| $a_{ent}$ | Entrainment regression rate parameter, $m^{2.6}/kg^{0.8} - sec^{0.2}$ |
| B | Blowing parameter |
| $C_{BI}$ | Blowing correction coefficient |
| $C_f$ | Friction coefficient |
| $C_{fref}$ | Reference friction coefficient |
| $C_l$ | Liquid specific heat, J/kg - K |
| $C_s$ | Solid specific heat, J/kg - K |
| G | Port average mass flux, $kg/m^2 - sec$ |
| h | Melt layer thickness, m |
| $h_v$ | Effective heat of gasification, J/kg |
| $h_{vcl}$ | Classical effective heat of gasification, J/kg |
| $L_m$ | Latent heat of melting, J/kg |
| $L_v$ | Latent heat of vaporization, J/kg |
| $L_{grain}$ | Length of the port, m |
| $M_{wg}$ | Mean molecular weight of the port gas, kg/kmole |
| $P_g$ | Port mean pressure (chamber pressure), $N/m^2$ (Pascal) |
| $P_d$ | Dynamic pressure in the port, $N/m^2$ |
| $\dot{Q}_r$ | Radiative heat flux, $J/m^2 - sec$ |
| $\dot{Q}_c$ | Convective heat flux, $J/m^2 - sec$ |
| $R_l$ | Thermal to radiation thickness ratio |
| $Re_z$ | Reynolds number based on distance along the port |
| $R_u$ | Universal gas constant, J/kmole - K |
| $\dot{r}$ | Surface regression rate, m/sec |
| $\dot{r}_{cl}$ | Local regression rate predicted by classical theory, m/sec |
| $r_e$ | Regression rate component due to entrainment, m/sec |
| $T_a$ | Ambient fuel temperature, K. |
| $T_g$ | Port mean temperature, K. |
| $T_m$ | Melting temperature, K. |
| $T_b$ | Boiling temperature, K. |
| $T_{interface}$ | Liquid-gas interface temperature, K. |
| $T_{solid}$ | Characteristic temperature for the solid, K. |
| $T_{liquid}$ | Characteristic temperature for the liquid, K. |
| $\Delta T_1$ | Temperature difference $T_{interface} - T_m$, K. |
| $\Delta T_2$ | Temperature difference $T_m - T_a$, K. |
| $U_g$ | Port average gas velocity, m/sec |
| z | Axial distance along the port, m |
| | Liquid thermal conductivity, J/m - sec - K |
| $\mu_l$ | Liquid viscosity, kg/m - sec |
| $\mu_g$ | Port mean gas viscosity, kg/m - sec |
| $\tau_{interface}$ | Shear stress at the liquid-gas interface, $N/m^2$ |
| $\rho_s$ | Solid density, $kg/m^3$ |
| $\rho_l$ | Liquid density, $kg/m^3$ |
| $\rho_g$ | Port average gas density, $kg/m^3$ |
| a | Surface tension, N/m |

The theory which underlies the present invention indicates that propellant surface tension and especially liquid layer viscosity at the combustion chamber conditions are the key physical properties that determine whether or not the propellant will entrain.

The inventors have found that members of the n-alkane (normal alkane) class of hydrocarbons, $C_n H_{2n+2}$ which are solid at room temperature and having a mean carbon number of n≥15, more preferably n is in the range of 15 to 80, with a range of 18 to 40 being most preferred, have low surface tension and viscosity at the melt layer conditions typical of hybrid rockets. According to the present invention, these fuels are predicted to have high regression rates at oxidizer mass fluxes covering a wide range of hybrid rocket applications. In addition to the n-alkanes, some isomers of the alkane series will also satisfy the entrainment criterion found by the inventors.

Above a certain molecular weight, entrainment does not occur. This includes polymeric materials which are often used in conventional hybrid rocket applications. Even though some of these polymers form a liquid layer, it is too viscous for entrainment to occur for the range of port mass fluxes encountered in hybrid rockets.

According to the present invention, the selection procedure is generally as follows. The entrainment onset criterion ($a_{onset}$) is used to estimate the combination of port mass flux given by:

$$G = \rho_g U_g \quad (1)$$

and liquid layer thickness, h, required to cause a given propellant to entrain. A high regression rate propellant is one that will entrain for the range of mass fluxes that are expected to occur in the given application. A number of fuels including the paraffin waxes, polyethylene waxes, solid organic acids and alkylnapthalenes fall into this category. A low regression rate propellant is one that, by this criterion, would only entrain for mass fluxes in excess of those produced in the given application. In other words, at the port mass flux the rocket is designed for, entrainment would not occur. Conventional hybrid fuels such as high density polyethylene (HDPE) fall into the latter category and typically burn at the rate predicted by classical hybrid theory. Thus, a significant advantage the method of the present invention is that it can be used to select a propellant that will exhibit a high regression rate tailored to a particular application or mission.

Propellant Selection Method

The analysis of liquid layer formation and entrainment was performed in three stages. A more detailed description may be found in Karabeyoglu, M. A. "Transient Combustion in Hybrid Rockets", Stanford University Ph.D. Thesis, August 1998 (reference 2), the entire description of which is hereby incorporated by reference. In the first stage, the formation of a melt layer on the solid surface was studied. In the second stage, the linear stability of the melt layer under the strong shear of a gas flow was examined. The linear stability model included the effect of the vertical motion of liquid at the liquid-solid interface due to the regression of the fuel slab. Later in the second stage the linear stability results were linked to the entrainment of liquid droplets through the use of both experimental results and semi-empirical relations found in the literature, references [3, 4, 5]. In the final stage, classical hybrid theory [1] was further developed to include liquid droplet entrainment. It is possible to show that the primary effect of the entrainment mass transfer is to increase the regression rate of the fuel without increasing the thermochemically defined blowing parameter. The implication of this is that the droplet entrainment mechanism does not rely on a reduced heat of gasification of the fuel. In the following paragraphs the details of each step of the selection process are described.

First, an estimation of the melt layer thickness as a function of regression rate is made. The film thickness formed on a burning slab under the combined heating of convection and radiation was considered. Physically, the thickness of the liquid layer is determined by the energy transfer relations both in the solid and also in the liquid. We are solely interested in the steady-state regression of the fuel slab. For that reason, the regression rate of the liquid-gas interface and the solid-liquid interface are assumed to be equal and constant. This, of course, implies that the thickness of the melt layer is also constant. For the sake of simplicity we further assumed that the thermophysical properties of the material both in the liquid phase and also in the solid phase are uniform. The effect of convection in the liquid layer was also ignored. This assumption can be justified for small melt layer thicknesses for which the Reynolds numbers are relatively small (a few hundred) and the temperature gradients are fairly large.

In the analysis, the possibility of the penetration of thermal radiation into the slab is considered. Several simplifying assumptions are introduced in the treatment of radiative heat transfer. First, the radiative flux field is assumed to be one dimensional. The absorbing character of both the liquid and the solid material is assumed to behave like a gray body; namely the absorption coefficient is independent of the frequency of the radiation.

Under these simplifications, the energy equations in the liquid and solid phases of the slab were used to solve for the thickness of the melt layer formed on the fuel surface. The results indicate that for a given fuel the melt layer thickness, h, is inversely proportional to the total regression rate of the fuel slab.

$$h = \frac{a_h}{\dot{r}} \quad (2)$$

where h is the liquid layer thickness, and $\dot{r}$ is the fuel surface regression rate due to the combined effects of vaporization and entrainment. A complete analysis of the liquid layer has been carried out. Two limiting cases are of primary interest depending on a parameter, $R_f$, which is the ratio of the thermal thickness to the radiative penetration thickness in the liquid layer.

If $R_f \gg 1$ the liquid layer is opaque to radiation from the flame and all the radiation is absorbed at the liquid-gas interface. In this case $$a_h = \left(\frac{\lambda}{\rho_l C_l}\right) Ln \left( \frac{1 + \frac{L_m}{C_s \Delta T_2} + \left(\frac{\rho_l}{\rho_s}\right)\frac{C_l \Delta T_1}{C_s \Delta T_2}}{1 + \frac{L_m}{C_s \Delta T_2}} \right). \quad (3)$$

Generally, one tries to achieve this condition by preferably adding a strong absorber such as carbon black to the propellant so that as much radiation as possible is absorbed in the liquid layer.

In the limit $R_f \ll 1$, the absorption of radiation in the liquid layer is small so that all of the radiative flux is absorbed in the solid. The thickness parameter, $a_h$, in this limit is given by $$a_h = \left(\frac{\lambda}{\rho_l C_l}\right) Ln \left\{ \frac{1 + \frac{L_m}{C_s \Delta T_2} + \left(\frac{\rho_l}{\rho_s}\right) \frac{C_l \Delta T_1}{C_s \Delta T_2} - \frac{h_v}{C_s \Delta T_2} \left(\frac{\dot{Q}_r / \dot{Q}_c}{1 + \dot{Q}_r / \dot{Q}_c}\right)}{1 + \frac{L_m}{C_s \Delta T_2} - \frac{h_v}{C_s \Delta T_2} \left(\frac{\dot{Q}_r / \dot{Q}_c}{1 + \dot{Q}_r / \dot{Q}_c}\right)} \right\} \quad (4)$$

where the characteristic temperatures differences are $$\Delta T_1 = T_{interface} - T_m; \ \Delta T_2 = T_m - T_a. \quad (5)$$

The heat of gasification averaged over all the mass leaving the fuel surface is $$h_v = C_s \Delta T_2 + L_m + \left(\frac{\rho_l}{\rho_s}\right) C_l \Delta T_1 + L_v \left(\frac{\dot{r}_v}{\dot{r}}\right) \quad (6)$$

where $(\dot{r}_v/\dot{r})$ is the fractional mass that vaporizes. The classical heat of gasification in the absence of droplet entrainment is $$h_{vcl} = C_s \Delta T_2 + L_m + \left(\frac{\rho_l}{\rho_s}\right) C_l \Delta T_1 + L_v. \quad (7)$$

The heat of gasification is the total heat required to transform the fuel from the solid state at its ambient temperature, $T_a$, to the gas state at the average liquid-gas interface temperature, $T_{interface}$. The factor $(\dot{r}_v/\dot{r})$ appearing in equation (6) accounts for the fact that a given parcel of fuel mass can reach the free stream through two routes; one route being vaporization and involving the usual four steps of solid heating, melting, liquid heating and evaporation; and the other route being entrainment and involving the first three steps but not requiring evaporation. The droplets do eventually evaporate as they convect along the port and interact with the flame but this process does not contribute to the heat or mass balance at the liquid-gas interface.

The average temperature at the liquid-gas interface, $T_{interface}$, must be estimated. As a first approximation one could take the boiling temperature of the liquid at standard conditions. Evaporation reduces this temperature slightly below boiling. Elevated vapor partial pressure tends to increase the boiling temperature but entrainment tends to decrease the temperature until, at high entrainment rates, the liquid layer thickness becomes small and the liquid-gas interface temperature approaches the melt temperature (a quantity which is insensitive to pressure). For simplicity, a reasonable estimate which is valid over the range of conditions of interest is used. We let $$T_{interface} = T_m + 0.8(T_b - T_m) \quad (8)$$

where $T_b$ is taken to be the boiling temperature of the liquid fuel at one atmosphere. The quantity $\dot{Q}_r/\dot{Q}_c$ is the ratio of radiative to convective heat transfer to the liquid-gas interface and must be estimated. A reasonable range, valid over the conditions found in hybrid rockets is $\dot{Q}_r/\dot{Q}_c<0.2$. Fortunately, as long as $\dot{Q}_r/\dot{Q}_c$ is small, the calculated value of the liquid layer thickness is not sensitive to errors in the quantities which appear in the logarithm. But notice that there is a critical value of $\dot{Q}_r/\dot{Q}_c$ when the denominator in the logarithm in (4) becomes zero. This corresponds to a condition where there is no steady state solution to the melting problem and the thickness of the liquid layer continues to grow toward a state where the entire block of fuel is being heated to the melting point by radiation.

The thermal diffusivity factor outside the logarithm in equation (4) is known reasonably well as a function of temperature.

A complicating factor in this picture is that the port mean pressure may exceed the critical pressure of the liquid. Thermodynamic equilibrium theory indicates that above the critical pressure the surface distinguishing liquid and gas is not precisely defined and the density varies continuously from the melt layer to the gas. In fact the melt layer in a hybrid rocket may not be in an equilibrium state and the detailed physics of the liquid-gas interface is not well understood. Thus in this document the word "droplet" has a generalized meaning referring to any parcel of propellant at or close to the density of the melt layer and the phrase "liquid-gas interface" refers to a transition layer from liquid to gas that may not have a distinct surface although the surface of maximum density gradient is often used as a reference. Nevertheless, one can assume that even above the critical pressure, the basic mechanism of instability of the melt layer and entrainment of parcels of propellant at or close to the melt density still occurs. Moreover, one can assume that a propellant that entrains under subcritical conditions will also entrain when the port mean pressure exceeds the critical pressure of the propellant.

Second, an estimation of the friction coefficient is made. The friction coefficient at the liquid-gas interface is approximately $$C_f = \frac{\tau_{interface}}{\frac{1}{2}\rho_g U_g} = C_{fref}(Re_z)^{-0.2} C_{BI} \quad (9)$$

where $\tau_{interface}$ is the shear stress at the gas-liquid interface. The reference shear stress is taken to be $C_{fref}=0.03$. The Reynolds number based on the distance, z, along the port is $$Re_z = \frac{\rho_g U_g z}{\mu_g} = \frac{Gz}{\mu_g}. \quad (10)$$

The factor $$C_{BI} = \left(\frac{2}{2 + 1.25 B^{0.75}}\right) \quad (11)$$

corrects (reduces) the surface friction for the effect of the evaporative mass transfer from the surface. This is a new correction factor which we have developed which is valid for $0<B<15$. The blowing parameter, B, is related to conditions at the flame sheet which are difficult to determine, however values between B=4 and B=10 are typical. In the calculations presented here we use B=6.

Third, an estimation of the classical propellant regression rate (without entrainment) is made. Classical hybrid theory describes the regression rate of hybrid fuels in the absence of entrainment. The widely accepted formula due to Marxman et al. (reference [1]) is $$\dot{r}_{cl} = C_f B \left(1 + \frac{\dot{Q}_r}{\dot{Q}_c}\right) \left(\frac{G}{\rho_s}\right). \quad (12)$$

When the expression for the friction coefficient is inserted, the result is $$\dot{r}_{cl} = a_{cl} G^{0.8}. \quad (13)$$

The factor $a_{cl}$ is, $$a_{cl} = C_{fref}\left(\frac{2\mu_g}{L}\right)^{0.2} C_{BI}\left(1 + \frac{\dot{Q}_r}{\dot{Q}_c}\right)\left(\frac{B}{\rho_s}\right) \quad (14)$$

with units $m^{2.6}/(kg^{0.8}-sec^{0.2})$. The equation (12) is a local relationship which depends weakly on the axial position in the port. Here and throughout we use the convention that the regression rates are evaluated at the midpoint of the port, i.e. at $z=L/2$.

Figure 5:
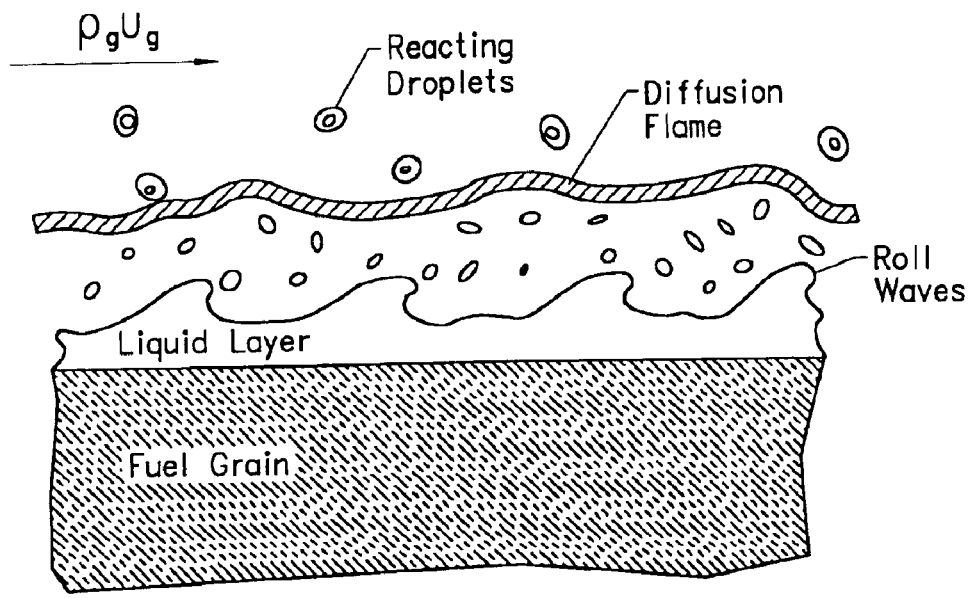
FIG. 5 is a schematic diagram showing entrainment of the melt layer during combustion according to the present invention.

Fourth, the entrainment onset criterion is developed. The instability of the melt layer needs to be related to the entrainment of liquid droplets into the gas stream. To this end, we investigated the linear stability of the melt layer formed on the solid fuel. This is shown in further detail in "Transient Combustion in Hybrid Rockets", which is incorporated by reference. This film is subjected to shear by the gas flow in the port and is also subjected to strong blowing due to the regression of the fuel surface. The large shear forces exerted by the high speed gas stream flowing through the port generates instability waves at the liquid-gas interface. A rigorous treatment of the entrainment problem requires an investigation of the nonlinear development of the instability waves and break-off of droplets as depicted in FIG. 5. The complete physics of this process is extremely complex. To address this difficulty we developed empirical relations for the droplet entrainment mechanism by using experimental data together with the linear stability results presented in "Transient Combustion in Hybrid Rockets".

Work on entrainment is reported in Reference [3], the description of which is hereby incorporated by reference. In this study, the entrainment rates from thin films of various liquids (including some hydrocarbons such as RP-1 (kerosene) and methanol) under strong shearing gas flow were measured. The experiments were performed in a wind tunnel and some tests were executed with hot gas flow.

The inventors have determined some important factors regarding entrainment mass transfer as follows:
if the mass flux in the port is less than a critical value there is no entrainment mass transfer from the film; and
the general empirical expression for the entrainment rate of liquid droplets (the entrainment regression rate) in terms of the relevant properties of the hybrid motor can be written as:

$$\dot{r}_e \propto \frac{(C_f P_d)^\alpha h^\beta}{\sigma^\gamma \mu_l^\delta}. \quad (15)$$

where $\alpha$ is approximately 1.5, $\beta$ is approximately 2.0 and $\gamma$ and $\delta$ are approximately 1.0. Here $P_d=(\frac{1}{2})\rho_g U_g^2$ is the dynamic pressure of the gas flow in the port. The powers of each parameter affecting the entrainment regression rate are positive, empirically determined quantities. In general, it can be stated that the entrainment increases with increasing port dynamic pressure and melt layer thickness and decreases with increasing viscosity and surface tension. This expression has central importance in determining how fast a selected fuel will burn.

A useful criterion for the onset of entrainment must account for two basic effects. First, at a given mass flux a thick liquid layer is more unstable and therefore more likely to entrain than a thin layer. Second, for a given liquid layer thickness a higher free stream gas mass flux is more likely to entrain than a lower mass flux. Following reference [5] the fundamental criterion for the onset of entrainment is $$G^{1.6} h^{0.6} \geq a_{onset} \quad (16)$$

where the factor $a_{onset}$ is, $$a_{onset} = 1.05 \times 10^{-2} \left(\frac{\rho_g^{1.3}}{\rho_l^{0.3}}\right) \frac{1}{(C_{fref} C_{BI})^{0.8}} \left(\frac{1}{\mu_g}\right) \sigma \mu_l^{0.6}. \quad (17)$$

The quantity, $a_{onset}$, is computed for a given fuel. If the computed value $a_{onset}$ is below a critical range, then the fuel is likely to entrain. According to the present invention, $a_{onset}$ is selected such that $a_{onset}$ has a value that promotes entrainment of droplets from the melt layer. Preferably, $a_{onset}$ is equal to or less than approximately 0.9, and more preferably $a_{onset}$ is equal to or less than 0.4. We recommend the following ranges:

$$\left.\begin{array}{l} a_{onset} < 0.4 \quad \text{entrainment will occur} \\ 0.4 \leq a_{onset} \leq 0.9 \quad \text{entrainment is likely} \\ a_{onset} > 0.9 \quad \text{entrainment is unlikely} \end{array}\right\}. \quad (18)$$

The units of $a_{onset}$ are $kg^{1.6}/(m^{2.6}-sec^{1.6})$.

It is important to recognize that several of the quantities appearing in equation (17) vary relatively little from one propellant to another. The factor, $\rho_l^{0.3}$, is fairly close to one over a wide range of liquid densities. For the range of blowing factors between 4 and 10, the coefficient, $C_{B1}$, is between approximately 0.2 and 0.4.

The gas density and viscosity make $\alpha_{onset}$ depend on the port mean temperature and pressure since $$\frac{\rho_g^{1.3}}{\mu_g} \propto \frac{P_g^{1.3}}{T_g^{2.05}}, \quad (19)$$

where the ideal gas law $P_g=(\rho_g R_u T_g)/M_{wg}$ and gas viscosity-temperature relation $\mu_g \propto T_g^{0.75}$ have been used. For hydrocarbon fuels, the port mean temperature varies relatively little over the range of applications so the main sensitivity is to the port mean pressure although the effect is not as strong as $P_g^{1.3}$ since as the pressure increases the temperature of the liquid-gas interface increases also, tending to partially mitigate the increase in $a_{onset}$ due to pressure.

At port mean pressures exceeding the critical pressure of the candidate propellant, the surface tension goes to zero and a quantitative analysis of entrainment must account for the increasingly diffusive nature of the mass transfer from the solid surface. One can expect that the central role of the viscosity of the melt layer indicated by equation (17) for subcritical conditions will continue to be dominant under supercritical conditions. Thus the onset criterion given by equation (17) is a formalism for identifying propellants which produce high entrainment under subcritical conditions with the understanding that they will also entrain when the port mean pressure exceeds the critical pressure of the material. For this reason, the values for $a_{onset}$ quoted here are all for a standard reference pressure of $P_g=10$ atm, and thus $a_{onset}$ may vary at different reference pressures.

The factor, $\sigma \mu_l^{0.6}$, in $a_{onset}$ indicates the important role of the surface tension and the viscosity, especially the viscosity, in determining whether a propellant will entrain. For most liquid hydrocarbons, the surface tension is in the range of 5 to 30 milliN/m. Thus, while the surface tension variation from one material to another is moderate, the viscosity varies widely. For example, the viscosity of high density polyethylene (HDPE) is a factor of $10^4$ larger than the viscosity of paraffin at typical melt layer temperatures.

A fuel that, at the classical regression rate corresponding to a given mass flux would produce a liquid layer thickness exceeding the onset criterion, is a fuel which is likely to entrain and is therefore a good candidate for a high regression rate fuel. We can use this idea to estimate the port mass flux above which entrainment should occur. Let $$h_{cl} \geq h_{onset} \quad (20)$$

Using equations (2), (13) and (16), to express equation (20) as $$\frac{a_h}{a_{cl} G^{0.8}} \geq \left(\frac{a_{onset}}{G^{1.44}}\right)^{\frac{1}{0.6}}. \quad (21)$$

The port mass flux required to cause the onset of entrainment for a given fuel is estimated as $$G_{onset} = \left(\frac{a_{cl}}{a_h}\right)^{\frac{0.6}{1.12}} (a_{onset})^{\frac{1}{1.12}}. \quad (22)$$

Note that this is a conservative (high) estimate of the onset port mass flux since it uses a thickness based on the classical regression rate.

High Regression Rate Fuels

Conventional hybrid fuels are all polymeric materials. The burning surface physics and chemistry of these materials are fairly complicated. Some of these fuels form a char layer whereas some form a liquid melt layer. Due to the large size of the long chain molecules in conventional liquefying polymeric fuels (even after some partial pyrolysis), the liquid layers formed on the fuel surface during the burning process have extremely high viscosity and surface tension. Even under the very strong shear forces exerted by the gas flowing through the port, these viscous liquid films are stable and entrainment of droplets into the gas stream does not occur.

On the contrary, according to the present invention, it is discovered that there are several classes of non-polymeric solid materials that form a liquid layer with low enough viscosity and surface tension such that the entrainment of liquid droplets does occur. This provides an important additional mechanism by which mass can be transferred from the solid fuel to the gas stream. We have found both theoretically and experimentally that the mechanism of liquid layer formation and droplet entrainment can increase the burning rate of hybrid fuels by two to five or more times the burning rate of classical hybrid fuels at identical operating conditions.

Application to N-Alkanes

Figure 6:
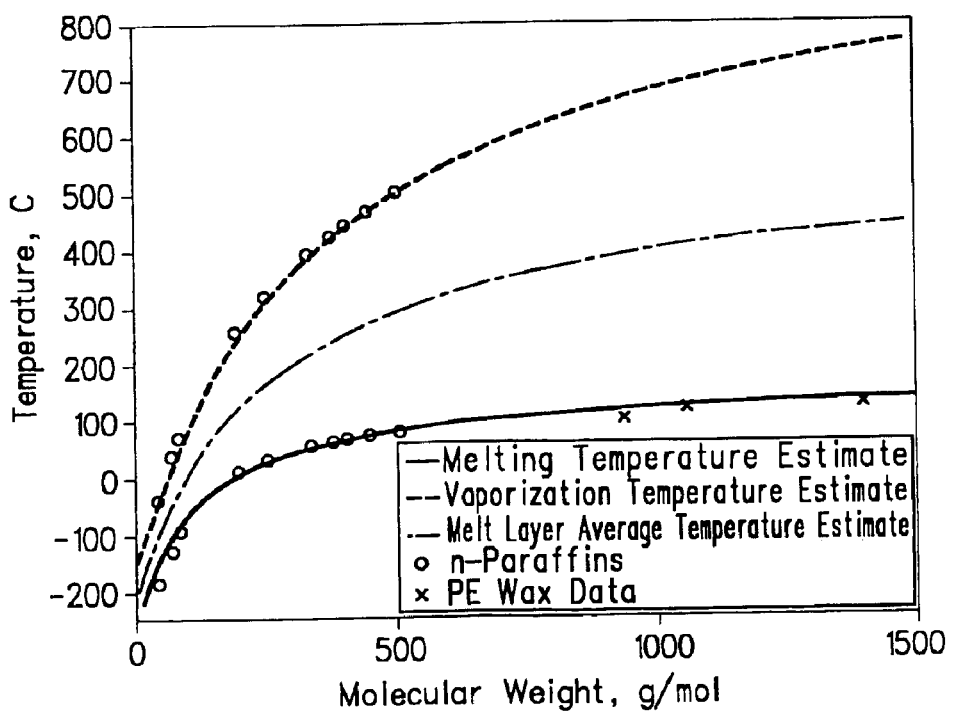
FIG. 6 is a graph illustrating melting, vaporization and average melt layer temperature of n-paraffins as a function of molecular weight and according to one embodiment of the present invention.

We applied the propellant identification process to several groups of organic compounds that are in solid phase under ambient conditions. The first and possibly the most significant group from a practical point of view is the series of n-paraffins ranging from Methane (n=1) all the way up to High Density Polyethylene (HDPE) polymer (n=14,000). Compounds suitable according to the present invention include the n-alkane class of hydrocarbons of the formula $C_nH_{2n+2}$ which are solid at room temperature and have a mean carbon number of $n \geq 15$, more preferably n is in the range of about 15–80, with a range of about 18 to 40 being most preferred and isomers of said alkane class of hydrocarbons. Also, mixtures of various compounds in the series are suitable. For this group important material properties such as viscosity can be expressed as a function of the molecular weight and the temperature. The melting, vaporization and average melt temperatures of the n-paraffins as functions of the molecular weight are shown in FIG. 6. Data points for the melting temperatures of three polyethylene waxes are included in FIG. 6. Note that all three temperatures increase rapidly in the small molecular weight region, whereas in the large molecular weight region they asymptote to a constant value. For large molecules the upper temperature limit is dictated by pyrolysis rather than vaporization, since the large molecules will tend to break up before the vaporization occurs. Note that the pyrolysis temperature for the high density polyethylene polymer is about 405 C., whereas the melting temperature limit corresponding to the melting temperature of the infinite molecular weight 100% crystalline polyethylene polymer is 141 C.

Figure 7:
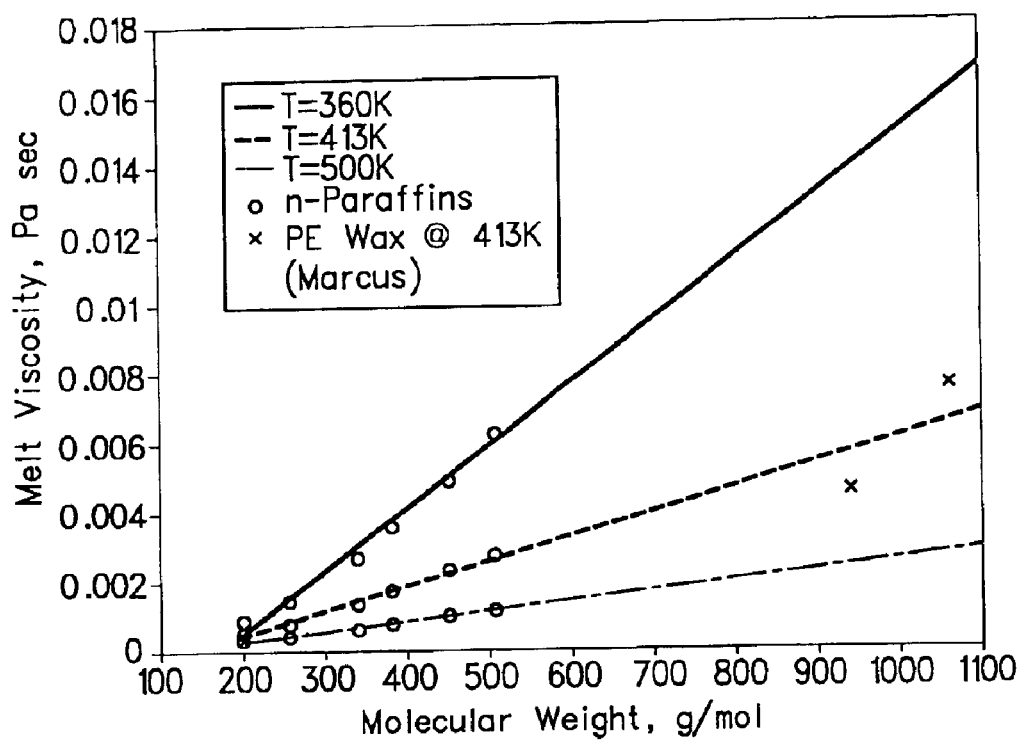
FIG. 7 is a graph depicting viscosity as a function of the molecular weight for various n-paraffins (normal paraffins) and two highly crystalline polyethylene waxes.

As discussed previously the most important parameters of the melt layer that determine the entrainment (and thus the total burning rate of a prospective fuel) are the melt viscosity at an average temperature between the melting temperature and the liquid-gas interface temperature, and the surface tension at the liquid-gas interface temperature. The plot of viscosity as function of the molecular weight of the normal hydrocarbons for three different temperatures are shown in FIG. 7. FIG. 7 shows a linear variation of viscosity with the molecular weight as expected in this low molecular weight regime. Two additional data points for two highly crystalline polyethylene waxes (4040/R7 and 4040/R9 of Marcus Oil & Chemical Corporation) are also included in the plot. This specific polyethylene wax is composed of highly linear molecules and its viscosity can be predicted by the extrapolation of the curve obtained for the n-paraffins. Although the figure shows a significant increase of viscosity with the molecular weight at a constant temperature, the melt layer viscosity actually only increases slightly due to the increase in the melt layer temperature. This important fact is presented in FIG. 8 which shows the reduced molecular weight dependence of the melt layer viscosity evaluated at the mean between melting and vaporization temperatures. Note that the viscosity values are normalized with respect to the n-pentane melt viscosity. However, this temperature effect can only be realized for relatively small molecular weights (i.e. paraffin waxes) since the temperature increase is quite small above a certain molecular weight.

Figure 8:
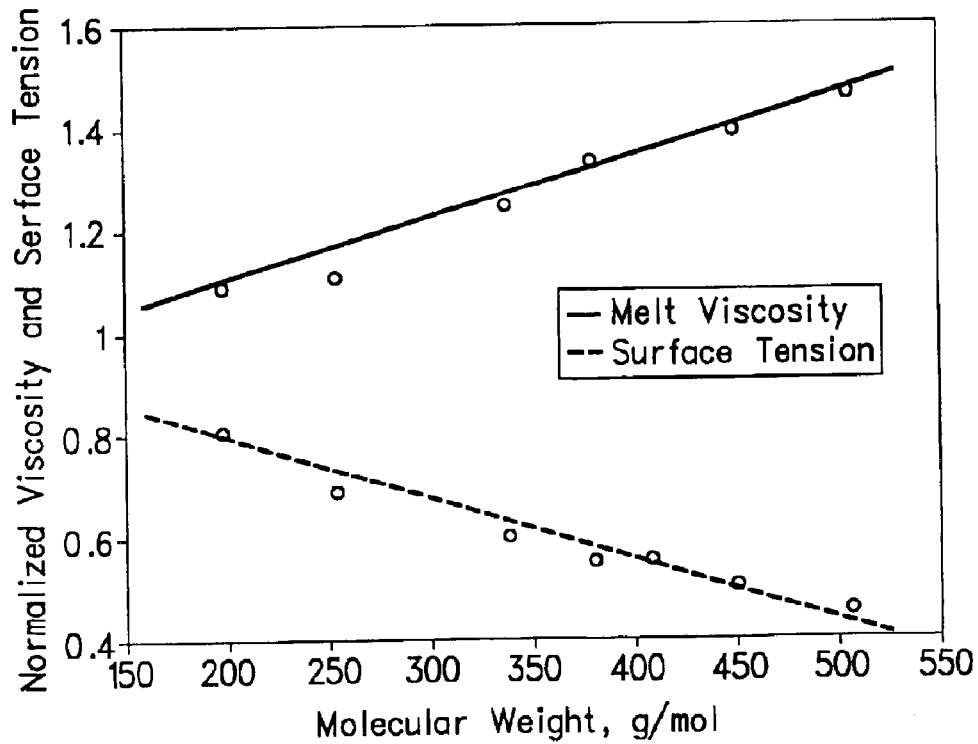
FIG. 8 shows the viscosity and surface tension of the melt layer as a function of the molecular weight for various n-paraffins according to one embodiment of the present invention.

Similar arguments hold for the surface tension. Even though the surface tension of the linear hydrocarbon series increases linearly with increasing molecular weight at a constant temperature, melt layer surface tension actually decreases with increasing molecular weight as shown in FIG. 8. This effect, which can only be realized for relatively small molecular weights, is also due to the increased melt layer surface temperatures with increasing molecular weight. These observations on the melt viscosity and surface tension indicate that moderate molecular weight, normal alkanes (i.e. paraffin waxes) will generate entrainment rates that are several times the regression rates of classical polymeric hybrid fuels. The combined effect of the increase in viscosity and decrease in surface tension is to modestly increase entrainment with increasing molecular weight in this range.

It is interesting to note that high density polyethylene (HDPE) polymer is also a member of this linear molecule family in the very high molecular weight extreme (~200,000 kg/kmole). The melt viscosity of the high density polyethylene is estimated at an average temperature between the melting point (135 C.) and the pyrolysis temperature (405 C.) with use of a technique presented in reference [6]. Note that a simple extrapolation cannot be used to determine the melt viscosity of these liquids with large molecules since above a critical value of the molecular weight, the linear variation of viscosity with molecular weight does not hold. The estimated viscosity value for HDPE is 20 Pascal-sec which is 4 orders of magnitude larger than the melt viscosity of paraffin wax or the viscosity of liquid pentane. This explains the low regression rates (i.e. no entrainment mass transfer) observed for melting polymeric fuels such as high density polyethylene.

Figure 9:
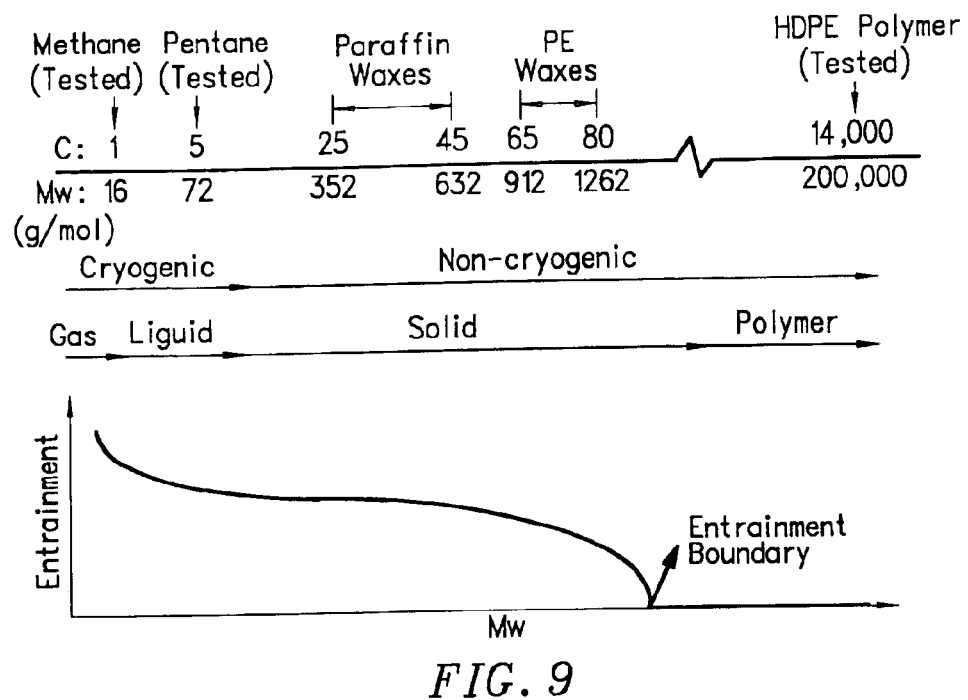
FIG. 9 illustrates the presence of entrainment for various n-paraffins as a function of their molecular weight.

FIG. 9 illustrates a qualitative schematic of the overall picture for n-paraffins ranging from the smallest molecular mass (methane) to HDPE polymer. Note that materials at both ends of the spectrum have been tried as hybrid fuels. Both extremes have significant deficiencies, namely the high molecular weight HDPE polymer burns slowly and the fast burning low molecular weight compounds are solid only under cryogenic conditions, reference [10]. It is remarkable that the non-cryogenic materials in the intermediate molecular mass region (potentially optimum for hybrid applications) such as paraffin and PE waxes have not previously been tried as hybrid rocket fuels.

First, we carried out a theoretical study of a specific high melting point (67 C.) paraffin wax. We estimated the material properties (an average melt viscosity of 0.65 milliPascals-sec and surface tension of 7.1 milliNewtons/m) of this wax (which would have an approximate average carbon number of 31) and applied the theory to show that liquid entrainment levels for this wax were quite high. The theory indicated that a paraffin wax with these properties was likely to burn several times, in particular 3 to 5 times, faster than conventional hybrid fuels.

Comparison Between Paraffin and Several Conventional Hybrid Fuels

Preliminary laboratory tests with Plexiglas (PMMA), high density polyethylene, HDPE a high molecular weight PE wax and two grades of paraffin wax with melting points of 61 C. and 67 C., hereafter referred to as paraffin grades A and B respectively were made. The wax was melted in a melt pot under a controlled pot temperature of 90 C. and mixed with carbon black (<1% mass fraction) with an average particle size of 18 nm. The mixture was molded in the motor case at room temperature and atmospheric pressure. The PE wax grains were machined with the appropriate port diameter to fit the motor case.

The conditions and results for these preliminary experiments are shown in Table 1 below. The regression rate values shown in Table 1 are calculated both by geometrical measurement of the change in the port dimensions and also by measuring the weight reduction in the grain during the experiment. Both methods yield similar values for the regression rate.

TABLE 1

| Propellant tested | HDPE | PMMA | PE wax | Paraffin wax A | Paraffin wax B |
|---|---|---|---|---|---|
| Initial port diameter cm | 1.27 | 1.27 | 1.27 | 1.27 | 1.27 |
| Port length cm | 30.5 | 30.5 | 18 | 18 | 18 |
| Burn time sec | 5 | 5 | 5 | 5 | 5 |
| Oxidizer flow rate gm/sec | 8.36 | 8.36 | 8.36 | 8.36 | 8.36 |
| Regression rate cm/sec | 0.025 | 0.028 | 0.036 | 0.114 | 0.100 |

Test results for the high molecular weight PE wax grains showed a 30% increase in regression relative to Plexiglas at identical operating conditions. As indicated by the theory this high molecular weight wax does form a melt layer, but does not entrain a significant amount of liquid droplets because the viscosity of the melt layer is too high. The regression rates for the paraffin grade B grains were found to be approximately 3.6 times larger than the regression rates measured for the Plexiglas material tested under identical operating conditions. After the burn, the paraffin grains were undamaged and the burning surface was smooth and very uniform in both the azimuthal and axial directions. It was also found that the lower molecular weight wax, grade A, burned slightly faster and the regression rate was determined to be approximately 4.1 times larger than the regression rate of Plexiglas (polymethyl methacrylate—PMMA).

Figure 11A:
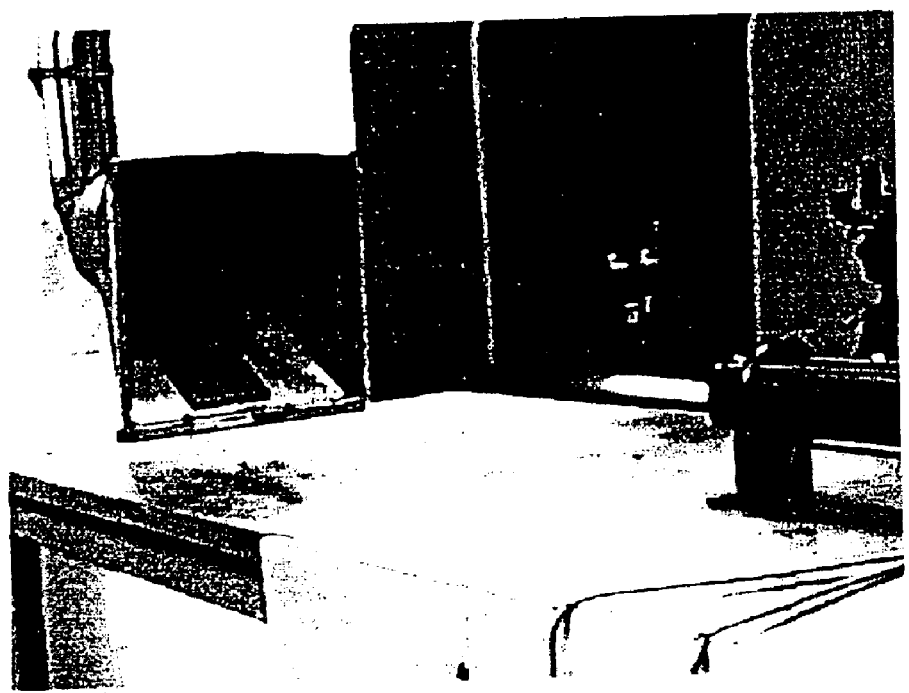
FIG. 11a is a photograph showing the plume from a conventional PMMA/GOX hybrid rocket systems.
Figure 11B:
FIG. 11b is a photograph showing the plume from a paraffin wax (grade B)/GOX hybrid rocket system of the present invention.

The plume length and diameter was observed to be several times larger for paraffin than for the other fuels even though the oxidizer mass flux was the same for all runs. The photos in FIGS. 11a and 11b provide a comparison between the plumes for PMMA and paraffin grade B.

Figure 10:
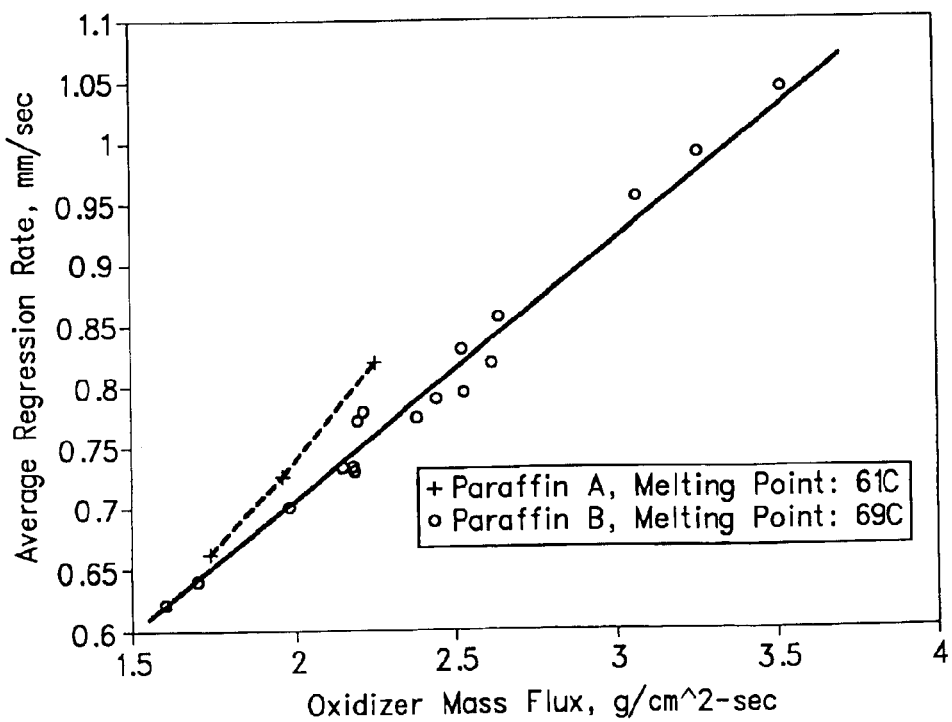
FIG. 10 is a graph showing regression rates as a function of oxidizer mass flux for paraffins A and B according to one embodiment of the present invention.

The space-time averaged regression rates obtained from multiple tests for wax grades A and B with an initial port diameter of 2.54 cm are plotted as a function of the average oxidizer flux in the port and are shown in FIG. 10.

A partial list of suggested additives that could be used in a practical fuel formulation based on the paraffin wax would include Carbon Black (0.2–1% by weight), some PE wax (or other kinds of high molecular weight synthetic waxes) to provide desired mechanical properties and thermal stability and possibly some density increasing agents such as Escorez. The role of carbon black (or an alternative material with high optical absorptivity) is to improve the radiative absorptivity of the fuel to insure that most of the radiation from the flame is absorbed at the fuel surface. This is important since paraffin wax alone may be heated in bulk by the penetration of radiation from the flame zone resulting in uncontrolled burning and possible sloughing of the fuel. Additionally, reinforcing or stiffening agents may be added to provide mechanical rigidity.

The grade of paraffin and the concentration of additives can be adjusted to obtain the combination of burning rate and mechanical properties that suits the mission under consideration. For example, for missions requiring low mass flow generation rates and high mechanical loading conditions, a high molecular weight paraffin could be selected and/or a significant concentration of PE wax could be added.

The fuel formulation can be varied spatially in the fuel grain in order to passively control the fuel mass flow generation rate as a function of time. This technique would allow one to design hybrid rockets with a desired thrust history and with little or no compromise in the specific impulse.

Other Organic Compounds

We have identified two other families of compounds that are good candidates for fast burning hybrid fuels. These are the alkhylnaphthalenes (including straight naphthalene) anthracene and certain organic acids. The organic acids finding use in the present invention include organic acids having the general formula of $CH_3(CH_2)_n COOH$, where n is in the range of 8 to 25, and mixtures thereof. Naphthalene $C_{10}H_8$ which is a crystalline material with a melting point of 354 K, is determined to possess melt layer properties that would allow for reasonable entrainment. Some of the other organic compounds that belong to the family of Alkhylnaphthalenes with lower melting points and slightly higher viscosity compared to Naphthalene are 2,6 Methylnaphthalene, 1-Phenylnaphthalene, 2,6-

Diethylnaphthalene and 2,6 Diisopropylnaphthalene [7]. All of these materials have high solid densities typically in the 1100–1200 kg/m³ range which is a very desirable property. One other close relative of Naphthalene which is also a good candidate as a high burning rate material is Anthracene $C_{14}H_{10}$. This promising material has a very high melting point (489 K), very low melt viscosity and surface tension and high solid density, 1300 kg/m³.

The other group of materials is the organic acids. First we consider the series of normal acids $CH_3(CH_2)_nCOOH$ with varying molecular weights. Similar to the paraffins, the melting temperature of the material increases with increasing number of the $CH_2$ group in the molecule. For example, for n=9 (n-nonanoic acid) the melting temperature is 286 K, whereas, for n=20 (n-eicosanic acid) melting occurs at 348 K. For this series, in the range of high enough melting temperatures, the melt viscosity and surface tension levels are moderate and the expected entrainment rates would be moderate compared to the level predicted and observed for paraffin waxes. This series may be useful as additives to higher entrainment rate fuel materials described previously. One important member of this series is Stearic acid n=18 which is a widely used additive for the paraffin waxes. It is known that Stearic acid modifies the mechanical properties of the paraffin wax. Another acid which is not a member of the normal acid family is Glutaric acid $C_5H_8O_4$. This particular acid has a melting point at 407 K and a solid density of 1427 kg/m³. It possesses a moderate to low melt viscosity and surface tension.

The above listed chemicals is not exhaustive, and is not an attempt to give a complete list of compounds that would be used as high burning rate fuel materials in hybrid rockets. The few examples discussed above is only a small fraction of the set of possible fast-burning fuel materials which would satisfy the teaching and criteria of the present invention.

System Implications of High Burning Rate

Figure 12A:
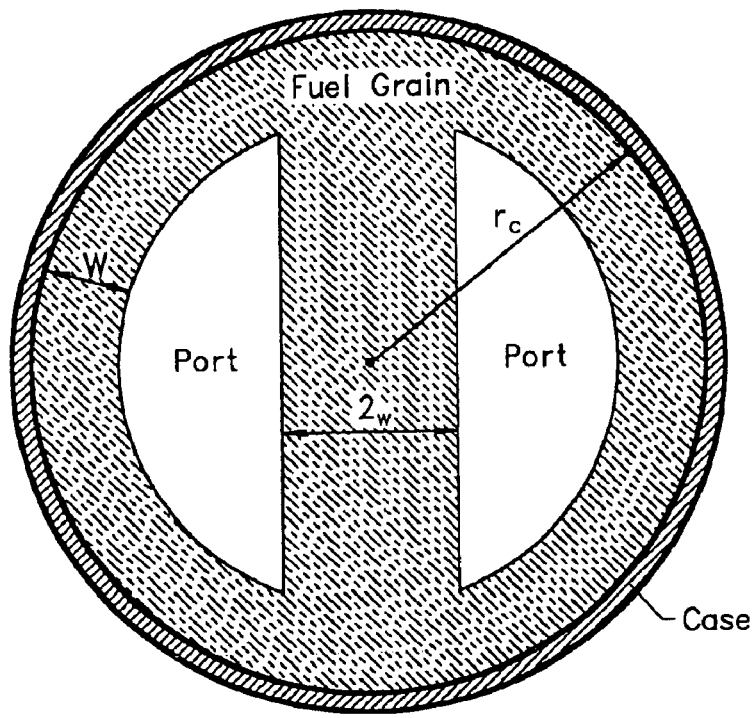
FIGS. 12a and 12b are schematic cross sectional end views of a double D port, and circular single port, hybrid rocket motor configurations, respectively, according to two embodiments of the present invention.
Figure 12B:
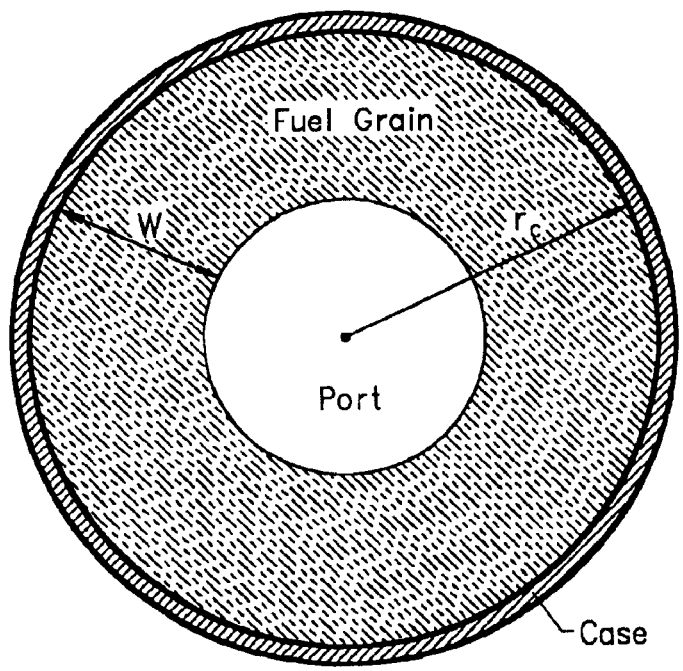

The impact of high burning rate on the design of a hybrid rocket vehicle is significant. If the burning rate is 3 to 5 times larger than the conventional hybrid fuels, a complicated wagon wheel design can, in many applications, be replaced with either a simplified Double D design as shown in FIG. 12a or even with a single port grain configuration as shown in FIG. 12b. The overall vehicle surface area is reduced and the vehicle volume would also be smaller due to better volumetric loading of the fuel. Of particular advantage, all these factors contribute to a smaller, lighter vehicle for a given mission and specified payload. Apart from the weight benefits, the manufacturing costs would be significantly reduced due to the simple grain design and use of relatively inexpensive fuels. The simpler design would lend itself to a more reliable system. In short, a hybrid utilizing a fast burning fuel according to the present invention is economically superior to a conventional hybrid or, for that matter, to a conventional liquid or solid system. The fast burning hybrid should be able to provide performance which is comparable to or better than a conventional solid or liquid system.

One other issue that deserves to be mentioned is aft oxidizer injection. Although oxidizer injection in the post-combustion chamber yields marginal advantages for conventional hybrids which operate in a multi-port configuration with a relatively thin web, it promises a greater benefit for the fast burning hybrid. Aft-end injection makes a partially controllable system (thrust or Isp, not both) a fully controllable one. Any given thrust and Isp schedule can be obtained by setting the main and aft-end oxidizer injection schedules. This makes the fast burning hybrid propulsion system comparable to liquid systems in terms of controllability.

In another embodiment of the present invention, the method of selecting a high regression rate fuel is provided in stepwise fashion as follows:

1) Specify the length of the fuel grain, $L_{grain}$ and port geometry.
2) Estimate or measure the thermochemical properties of the candidate material including the melting temperature, $T_m$, the normal boiling temperature, $T_b$, latent heat of fusion, $L_m$ and latent heat of vaporization, $L_v$.
3) Estimate the temperature of the liquid-gas interface using $$T_{interface} = T_m + 0.8(T_b - T_m)$$

Here $T_b$ is the normal boiling temperature of the candidate material. The use of normal boiling point to evaluate the surface temperature implicitly assumes a surface vapor partial pressure of approximately 1 atm. The surface temperature is reduced from its vaporization value using equation (8) to account for the effect of entrainment which decreases the effective surface temperature.

4) Calculate the characteristic solid temperature as $$T_{solid} = \frac{T_m + T_a}{2}$$

Calculate the characteristic melt layer temperature as $$T_{liquid} = \frac{T_m + T_{interface}}{2}$$

5) Evaluate the properties of the solid at $T_{solid}$ including $C_s(T_{solid})$
6) Evaluate liquid layer properties other than surface tension at $T_{liquid}$ including $C_l(T_{liquid})$, $\rho_l(T_{liquid})$ and $\mu_l(T_{liquid})$
7) Evaluate the surface tension, $\sigma$, at $T_{interface}$.
8) Calculate the entrainment onset parameter $$a_{onset} = 1.05 \times 10^{-2} \left(\frac{\rho_g^{1.3}}{\rho_l^{0.3}}\right) \frac{1}{(C_{fref} C_{B1})^{0.8}} \left(\frac{1}{\mu_g}\right) \sigma \mu_l^{0.6}.$$

The gas density is calculated from the ideal gas law.

$$\rho_g = \frac{P_g M_{wg}}{R_u T_g}$$

where the universal gas constant is $R_u$=8314 J/kmole-K and the units of $P_g$ are N/m². The following values are suggested for preliminary calculations:

$M_{wg}$=30 kg/kmole; $T_g$=1500K; $P_g$=10 atm $\mu_g$=6.6×10⁻⁵ kg/m-sec; $C_{fref}$=0.03; B=6

9) Entrainment Criterion—Use the following ranges.

$a_{onset}$<0.4 entrainment will occur 0.4≤$a_{onset}$≤0.9 entrainment is likely $a_{onset}$>0.9 entrainment is unlikely The units of $a_{onset}$ are $kg^{1.6}/(m^{2.6}-sec^{1.6})$.
10) Determine $a_{cl}$ and $a_h$ and estimate the port mass flux required for entrainment at $P_g = 10$ atm.

$$(G_{onset})_{P_g=10} = \left(\frac{a_{cl}}{a_h}\right)^{\frac{0.6}{1.12}} (a_{onset})^{\frac{1}{1.12}}$$

The entrainment onset mass flux at the port mean pressure of the given application is determined from $$\frac{G_{onset}}{(G_{onset})_{P_g=10}} = \left(\frac{P_g}{10}\right)^{\frac{1.3}{1.12}}$$

If $G_{onset}$ is below the port mass flux expected in the given application then regression rate enhancement due to entrainment can be expected to occur.

EXAMPLES

The following examples are offered for illustration purposes only, and is not intended to limit the present invention in any way.

Paraffin Fuel Example

Propellant Selection Process

1) We carried out a series of experiments on paraffin grade B with an initial port diameter of 2.54 cm. The length of the fuel grain in these experiments was $L_{grain}=0.18$ m and the port mean pressure was approximately $P_g=10$ atm.
2) The following parameters are estimated for the selected grade of wax (melting point 66.6C.

$T_m=339.6$ K; $T_{boiling}=727.4$ K (1 atm)

$L_m=167.2\times10^3$ J/kg; $L_v=163.5\times10^3$ J/kg

2) The liquid-gas interface temperature is calculated to be $T_{interface}=649.8$ K.

3) The characteristic temperatures of the melt layer and the solid are $T_{solid}=319.8$ K; $T_{liquid}=494.7$ K where the ambient temperature of the fuel is taken as $T_a=300.0$ K.

4) Solid state properties evaluated at the characteristic temperature are $C_s=2.03\times10^3$ J/kg-K; $\rho_s=930$ kg/m$^3$.

5) Liquid state properties evaluated at the characteristic temperature are $C_l=2.92\times10^3$ J/kg-K; $\rho_l=654.4$ kg/m$^3$ $\mu_l=0.65\times10^{-3}$ kg/m-sec; $\lambda_l=0.12$ J/m-K-sec 6) Estimate the surface tension $\sigma=7.1\times10^{-3}$ N/m 7) We use the following suggested values:

$M_{wg}=30$ kg/kmole; $T_g=1500$K; $B=6$ $\mu_g=6.6\times10^{-5}$ kg/m-sec; $C_{fref}=0.03$ 8) The entrainment onset parameter is calculated to be $a_{onset}=0.276$ kg$^{1.6}$/(m$^{2.6}$-sec$^{1.6}$)

Since $a_{onset} \leq 0.4$ the selected grade of wax will entrain vigorously.

9) The entrainment onset mass flux is, $G_{onset}=5.2$ kg/(m$^2$-sec)

which is low compared to corrected port mass fluxes encountered in hybrid applications. When the onset mass flux is corrected to a high port mean pressure of 100 atmospheres, the value of $G_{onset}$ increases to 69.4 kg/(m$^2$-sec) which is still well below the range of mass fluxes encountered in applications.

Regression Rate Measurements for Paraffin (Melting Point 67 C.)

Figure 13:
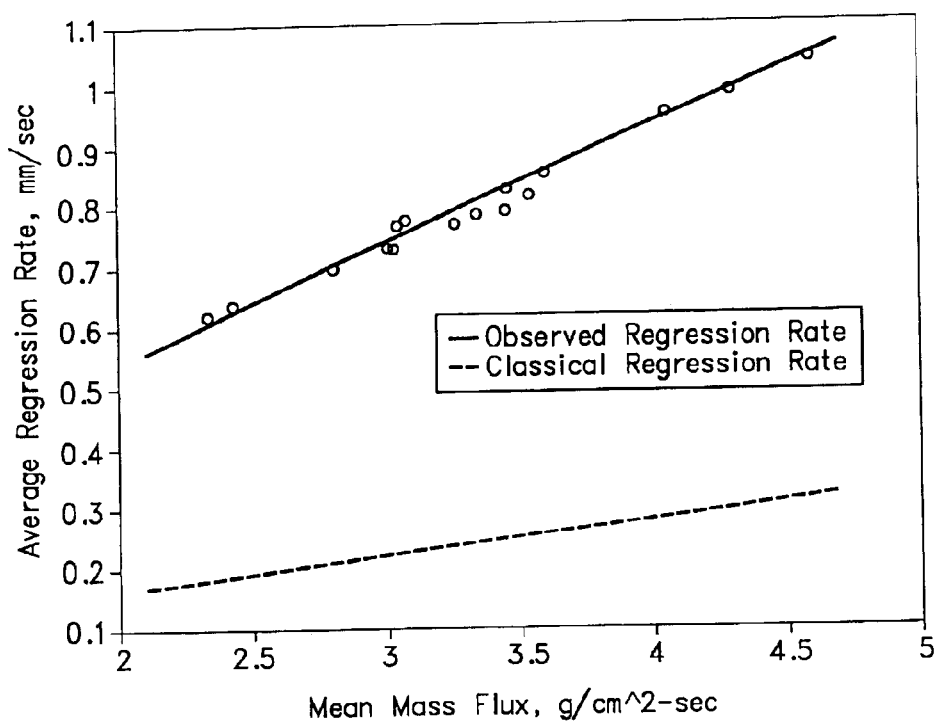
FIG. 13 is a graph showing the regression rate for paraffin wax B according to the present invention, in comparison to the estimated classical regression rate of the prior art.

The paraffin data for the grade B wax are presented in FIG. 13 as a function of the total mass flux in the port. For $B=6$, $L=0.18$ m and $\dot{Q}_r/\dot{Q}_c=0.1$ the classical regression rate coefficient is estimated to be $a_{cl}=1.48\times10^{-5}$ m$^{2.6}$/kg$^{0.8}$-sec$^{0.2}$.

The classical regression rate curve is plotted in FIG. 13 for comparison with the data. Over the range of mass fluxes studied, the regression rate measured for paraffin is approximately 3.4 times the rate predicted from classical theory.

Entraining Onset Examples for Other Organic Compounds

The entrainment onset parameter has been determined for a variety of organic compounds at $P_g=10$ atm and with $B=6$. The results are shown in table 2.

TABLE 2

| Material | Naphthalene $C_{10}H_8$ | 1-Phenyl naphthalene $C_{16}H_{12}$ | 2,6 Diethyl naphthalene $C_{14}H_{16}$ | Antracene $C_{14}H_{10}$ | Stearic acid $C_{18}H_{36}O_2$ | Glutaric acid $C_5H_8O_4$ | Paraffin B $C_{31}H_{64}$ |
|---|---|---|---|---|---|---|---|
| $T_m$, K | 353.43 | 318.15 | 322.15 | 489.25 | 342.75 | 370.65 | 339.6 |
| $T_{boiling}$, K | 491.14 | 607.15 | 576.00 | 615.18 | 648.35 | 576.15 | 727.4 |
| $\rho_l$, kg/m$^3$ | 936.7 | 987.5 | 921.94 | 939.72 | 764.12 | 1136.2 | 654.4 |
| $\rho_s$, kg/m$^3$ | 1049 | 1096 | 1168 | 1233 | 1010 | 1429 | 930 |
| $\mu_l$, | 0.54 | 1.00 | 0.81 | 0.47 | 1.30 | 0.68 | 0.65 |

TABLE 2-continued

| Material | Naphthalene $C_{10}H_8$ | 1-Phenyl naphthalene $C_{16}H_{12}$ | 2,6 Diethyl naphthalene $C_{14}H_{16}$ | Antracene $C_{14}H_{10}$ | Stearic acid $C_{18}H_{36}O_2$ | Glutaric acid $C_5H_8O_4$ | Paraffin B $C_{31}H_{64}$ |
|---|---|---|---|---|---|---|---|
| milliPa-sec σ, milliN/m | 21.7 | 20.2 | 21.0 | 19.6 | 11.1 | 12.5 | 7.1 |
| $a_{onset}$, $\frac{kg^{1.6}}{m^{2.6} - sec^{1.6}}$ | 0.678 | 0.899 | 0.841 | 0.563 | 0.625 | 0.424 | 0.276 |

The parameter values for paraffin are shown for comparison. Each of the materials listed above is likely to entrain in a hybrid motor application with the possible exception of 1-phenyl naphthalene. Note that they are relatively dense compared to paraffin and can be mixed with paraffin to increase fuel density without sacrificing much entrainment. Notice also that, of all the compounds listed, paraffin grade B will exhibit the most vigorous entrainment with $a_{onset}=0.276$. Lower melting point waxes n<31 will tend to entrain even more vigorously.

In summary, the present invention provides a high regression rate propellant and a method for identifying such propellants that produce high burning rates in hybrid rockets and other applications such as solid fuel ramjets. The propellant can be either a fuel or an oxidizer. The propellants are materials which form an unstable melt layer at the burning surface. Under the right conditions of port mass flux, liquid layer surface tension, and viscosity, droplets may be entrained from the liquid layer into the high temperature gas flow in the port. The process is based on a criterion by which one can determine whether entrainment will occur for a given material.

The inventors have discovered that a class of non-cryogenic fuels which satisfies the required criterion is a certain range of n-alkanes. This range includes all paraffin waxes and polyethylene waxes. More specifically, we include alkanes having a carbon number of approximately n=15 to n=80. Other hydrocarbon compounds have also been identified that satisfy the required criterion. These include the alkhylnaphthalenes (including straight naphthalene), anthracene, and certain organic acids. These relatively dense materials can also be used as additives to paraffin based fuels. Mixtures of materials can also be used.

For example, paraffin wax can be easily mixed with polyethylene (PE) wax as well as carbon black and/or other common additives such as Stearic acid.

The performance of a hybrid system can be optimized for a given mission profile by mixing high and low molecular weight alkanes together to achieve the required regression rate.

The use of such a high burning rate fuel leads to a simpler hybrid rocket system wherein a single or double D port design can equal or exceed the performance of a conventional solid or liquid rocket.

While the present invention has been described primarily with use in hybrid rockets and ramjets, the present invention is suitable for use in many types of gas generation applications, such as auxiliary power units (APU), tank pressurization systems in liquid or hybrid rocket applications, and turbine power generation systems.

As taught by the foregoing description, a greatly advanced hybrid propulsion system and a method has been provided by the present invention. The foregoing description of specific embodiments and examples of the invention have been presented for the purpose of illustration and description, and although the invention has been illustrated by certain of the preceding examples, it is not to be construed as being limited thereby. Many modifications, embodiments and variations are possible in light of the above teaching. It is intended that the scope of the invention encompass the generic area as herein disclosed, and by the claims appended hereto and their equivalents.

What is claimed is:

1. A method of combusting a propellant within a port, comprising the steps of:

flowing a gas stream through the port; and
   combusting said propellant and gas, wherein said propellant consists essentially of a mixture of one or more paraffin waxes, and carbon black at a concentration in the range of about 0.2 to 2.0 weight percent.

2. The method of claim 1 wherein said propellant includes one or more stiffening agents.

3. The method of claim 1 wherein the mixture of one or more paraffin waxes has an average melting point of 69° C.

4. The method of claim 1 wherein the mixture of one or more paraffin waxes has an average melting point of 61° C.

5. A method a propelling a propulsion system, the propulsion system having a structure terminating in a nozzle and said structure comprising a propellant within a port, comprising the steps of:

flowing a gas stream through the port; and
   combusting said propellant and gas, wherein said propellant consists essentially of a mixture of one or more paraffin waxes, and carbon black at a concentration in the range of about 0.2 to 2.0 weight percent.

* * * * *